(12) United States Patent
Mixon-Baca et al.

(10) Patent No.: US 11,698,977 B1
(45) Date of Patent: Jul. 11, 2023

(54) PREDICTING AND QUANTIFYING WEAPONIZATION OF SOFTWARE WEAKNESSES

(71) Applicant: Ivanti, Inc., South Jordan, UT (US)

(72) Inventors: Benjamin Anthony Mixon-Baca, Albuquerque, NM (US); Srinivas Mukkamala, Albuquerque, NM (US)

(73) Assignee: Ivanti, Inc., South Jordan, UT (US)

( * ) Notice: Subject to any disclaimer, the term of this patent is extended or adjusted under 35 U.S.C. 154(b) by 65 days.

(21) Appl. No.: 17/098,074

(22) Filed: Nov. 13, 2020

Related U.S. Application Data

(60) Provisional application No. 62/934,978, filed on Nov. 13, 2019.

(51) Int. Cl.
*G06F 21/57* (2013.01)
*G06N 20/00* (2019.01)

(52) U.S. Cl.
CPC ........... *G06F 21/577* (2013.01); *G06N 20/00* (2019.01); *G06F 2221/033* (2013.01)

(58) Field of Classification Search
CPC .. G06F 21/577; G06F 2221/033; G06N 20/00
See application file for complete search history.

(56) References Cited

U.S. PATENT DOCUMENTS

| | | |
|---|---|---|
| 7,941,855 B2 | 5/2011 | Sung et al. |
| 9,306,962 B1 | 4/2016 | Pinto |
| 10,050,999 B1 | 8/2018 | Rossman |
| 2005/0050377 A1 | 3/2005 | Chan et al. |
| 2007/0143672 A1 | 6/2007 | Lipton et al. |
| 2009/0319249 A1 | 12/2009 | White et al. |
| 2013/0198119 A1 | 8/2013 | Eberhardt, III et al. |
| 2014/0096249 A1 | 4/2014 | Dupont et al. |
| 2015/0082442 A1 | 3/2015 | Chauhan et al. |
| 2015/0213207 A1 | 7/2015 | Amarasingham et al. |
| 2015/0381649 A1* | 12/2015 | Schultz .............. G06Q 10/0635 726/25 |
| 2016/0099962 A1 | 4/2016 | Peach et al. |
| 2016/0110549 A1* | 4/2016 | Schmitt ..................... G06F 8/77 726/25 |
| 2017/0220964 A1 | 8/2017 | Ray |
| 2017/0363504 A1 | 12/2017 | Winant et al. |
| 2018/0124097 A1* | 5/2018 | Tiwari ................ H04L 63/1425 |
| 2018/0295154 A1 | 10/2018 | Crabtree et al. |
| 2020/0210775 A1* | 7/2020 | Patel ....................... G06F 16/215 |
| 2020/0226048 A1* | 7/2020 | Kimura ............... G06F 11/3466 |
| 2020/0351298 A1 | 11/2020 | Paturi et al. |
| 2020/0356663 A1 | 11/2020 | Paturi et al. |
| 2020/0396244 A1 | 12/2020 | Paturi et al. |
| 2021/0042297 A1* | 2/2021 | Urbanke ................ G06N 20/00 |

* cited by examiner

Primary Examiner — Meng Li

(57) ABSTRACT

A method and/or computer software for estimating the probability that a software weakness will be used in an exploit and/or malware and the probability that the developed exploit and/or malware will result in a compromise.

19 Claims, 5 Drawing Sheets

Modelling Data 300

Software Weakness Data 301

Exploit and/or Malware Data 302

Compromise Data 303

Fig. 3

PREDICTING AND QUANTIFYING WEAPONIZATION OF SOFTWARE WEAKNESSES

CROSS-REFERENCE TO RELATED APPLICATIONS

This application claims priority to and the benefit of the filing of U.S. Provisional Patent Application No. 62/934,978, entitled "Methodology for Predicting and Quantifying Weaponization of Software Weaknesses", filed on Nov. 13, 2019, and the specification thereof is incorporated herein by reference.

BACKGROUND OF THE INVENTION

Embodiments of the present invention relate generally to security of computing devices and software. More specifically, embodiments of the present invention relate to techniques for predicting weaponization of software weakness, which includes prediction and probability of successful digital compromise via the exploit and/or malware based on human cognitive analysis fused with machine learning.

Estimating the probability that a software weakness will be used in an exploit and/or malware, and the probability that the developed exploit and/or malware will result in compromise in the real world are useful pieces of information to organizations dependent on software for operations.

Statistical sampling, clustering, classification, regression, novelty detection, reinforcement learning, and survival analysis are powerful tools that are preferably used to provide insight to organizations about the amount of risk the software they use poses. Often, organizations depend on hundreds, thousands, or more of heterogeneous hardware platforms running comparably disparate software products. This creates challenges for organizations because every platform must be kept as secure as possible through patching, segmentation, or other mechanisms. Because of this scale, prioritization tools must be used in order for organizations to efficiently allocate resources to ensure an acceptable level of security. Embodiments of the present invention relate to such numerical tools for resource allocation by analyzing data on software weaknesses, exploit and/or malwares, and digital compromise data, using a combination of statistical sampling, clustering, classification, regression, novelty detection, reinforcement learning, and survival analysis to enrich and/or replace existing prioritization metrics. Throughout this application, the term "modeling data" is intended to mean software weaknesses, exploits, malware, and/or digital compromise.

A digital compromise starts with an exploit and/or malware, which in turn starts with one or more software weaknesses that are weaponized. These weaknesses are cataloged across various data sources. An example of a weaponized software weakness, later incorporated into multiple exploits and/or malware, is EternalBlue, a software weakness in Microsoft Windows SMB protocol. EternalBlue is incorporated into several prolific exploits and malware, namely, WannaCry, NotPetya, Metasploit Framework and Koadic Post Exploitation Tool. WannaCry and NotPetya are examples of ransomware, that is, software that generally creates a denial of service condition and forces the victim to pay the attacker to restore services. Both WannaCry and NotPetya utilized EternalBlue to gain an initial foothold into the organization. Both tools further aggregate other tools to perform their post exploitation activities. The resulting compromises leads to organizations either paying for their assets to be unencrypted, losing money in the form of restoring assets from backups, or losing their assets entirely. Metasploit Framework and Koadic are both industrial strength tools for compromising and perform post exploitation activities. Both tools have similarly incorporated EternalBlue into their code. Such exploits and/or malware pose a serious threat to organizations because it is difficult to predict whether a specific software weakness will be used in an exploit and/or malware's implementation, and whether the organization will be compromised by such an exploit and/or malware.

There is thus a present need for a method and computer software that can estimate the probability that a software weakness will be used in an exploit and/or malware. And, there is especially a present need for a method and computer software that can also estimate the probability that the developed exploit and/or malware will result in a compromise.

BRIEF SUMMARY OF EMBODIMENTS OF THE PRESENT INVENTION

Embodiments of the present invention relate to a method for providing a likelihood that a software weakness will be used in a future compromise including generating one or more covariates by performing a first preprocessing transformation on modeling data, and inputting training group data into a prediction program to create one or more models that predict whether a software weakness will be integrated into an exploit and/or malware. The modeling data can optionally include an aggregation of two or more items of data selected from software weakness data, exploit data, malware data, compromise data, and/or a combination thereof. The software weakness can include code that causes one or more of local code execution, remote code execution, denial of service, unauthorized and/or unintentional reading and/or modification of data or instructions in a program or outside of a program, and/or a combination thereof. The exploit and/or malware can include code that uses the software weaknesses and which causes one or more of code execution, denial of service, unauthorized read and/or write of a program running code with the software weakness, performance of an operation desired by an entity using the exploit and/or malware, and/or a combination thereof.

The method can also include splitting the modeling data into at least three groups of data, wherein at least one of the at least three groups of data comprises the training group data. Optionally, splitting the modeling data into at least three groups of data can include splitting the modeling data into at least three groups that includes the training data group, a testing data group, and a validation data group.

The method can also include selecting a model based on its accuracy, applying the selected model to the modeling data, and applying a second preprocessing transformation program to one or more of the output of the prediction program, the modeling data, and/or a simulated compromise covariate. The method can also include performing a second statistical sampling function to an output of the second preprocessing transformation program, applying an output of the second statistical sampling function to a second one or more predictive programs, and an output of the second one or more predictive programs providing indicia of a probability that a software weakness will be used in a future compromise. Selecting a model based on its accuracy can include first testing the one or more models to determine an accuracy of each of the one or more models before selecting the model based on its accuracy.

In one embodiment, the method can also include performing a first statistical sampling function on the one or more covariates. The first statistical sampling function can be configured to perform one or more functions that can include splitting the modeling data apart, reorder each entry of the modeling data, randomly shuffle the modeling data, and/or combinations thereof. The first statistical sampling optionally performs upsampling and/or downsampling techniques.

Embodiments of the present invention also relate to a non-transitory computer-readable medium comprising computer software for providing a likelihood that a software weakness will be used in a future compromise that includes code for generating one or more covariates by performing a first preprocessing transformation on modeling data, and code for inputting training group data into a prediction program to create one or more models that predict whether a software weakness will be integrated into an exploit and/or malware. The non-transitory computer-readable medium can also include code for splitting the modeling data into at least three groups of data, wherein at least one of the at least three groups of data comprises the training group data. Optionally, code for splitting the modeling data into at least three groups of data can include code for splitting the modeling data into at least three groups that include the training data group, a testing data group, and a validation data group.

In one embodiment, the non-transitory computer-readable can also include code for selecting a model based on its accuracy, code for applying the selected model to the modeling data, and code for applying a second preprocessing transformation program to one or more of the output of the prediction program, the modeling data, and/or a simulated compromise covariate.

The non-transitory computer-readable medium can further include code for performing a second statistical sampling function to an output of the second preprocessing transformation program, code for applying an output of the second statistical sampling function to a second one or more predictive programs, and an output of the second one or more predictive programs can provide indicia of a probability that a software weakness will be used in a future compromise.

In one embodiment, code for selecting a model based on its accuracy can include code for first testing the one or more models to determine an accuracy of each of the one or more models before selecting the model based on its accuracy. The non-transitory computer-readable medium can also include code for performing a first statistical sampling function on the one or more covariates.

The code for the first statistical sampling function can include code that is configured to perform one or more of splitting the modeling data apart, reordering each entries of the modeling data, randomly shuffle the modeling data, and/or a combination thereof. Optionally, code for the first statistical sampling can include code for performing upsampling and/or downsampling techniques.

Embodiments of the present invention preferably include one or more data storage mechanisms, one or more processors, and one or more programs that perform statistical classification, statistical regression, statistical clustering, and/or novelty detection. The program for statistical classification, statistical regression, statistical clustering, and/or novelty detection is preferably stored in one or more data storage mechanisms that can optionally be the same as or different from the one or more storage mechanisms in which the data used by the program are stored. One advantage of the system, from the perspective of software, is that the underlying algorithm works on a broad class of software—it is not limited to any portion of the software stack or a programming language. For example, the underlying algorithm is not limited to only the operating system, only the firmware, or only user-level applications. This gives the system wide applicability to diverse environments in both the public and private sectors. From the perspective of software weaknesses and exploits and/or malware the system has broad applicability because it takes into account the fact that software weaknesses, subsequent exploits and/or malware are often packaged together in novel ways by malicious entities.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 3 is a drawing which illustrates logical components of a data set that can be used for modeling and prediction according to an embodiment of the present invention;

DETAILED DESCRIPTION OF THE INVENTION

Figure 1:
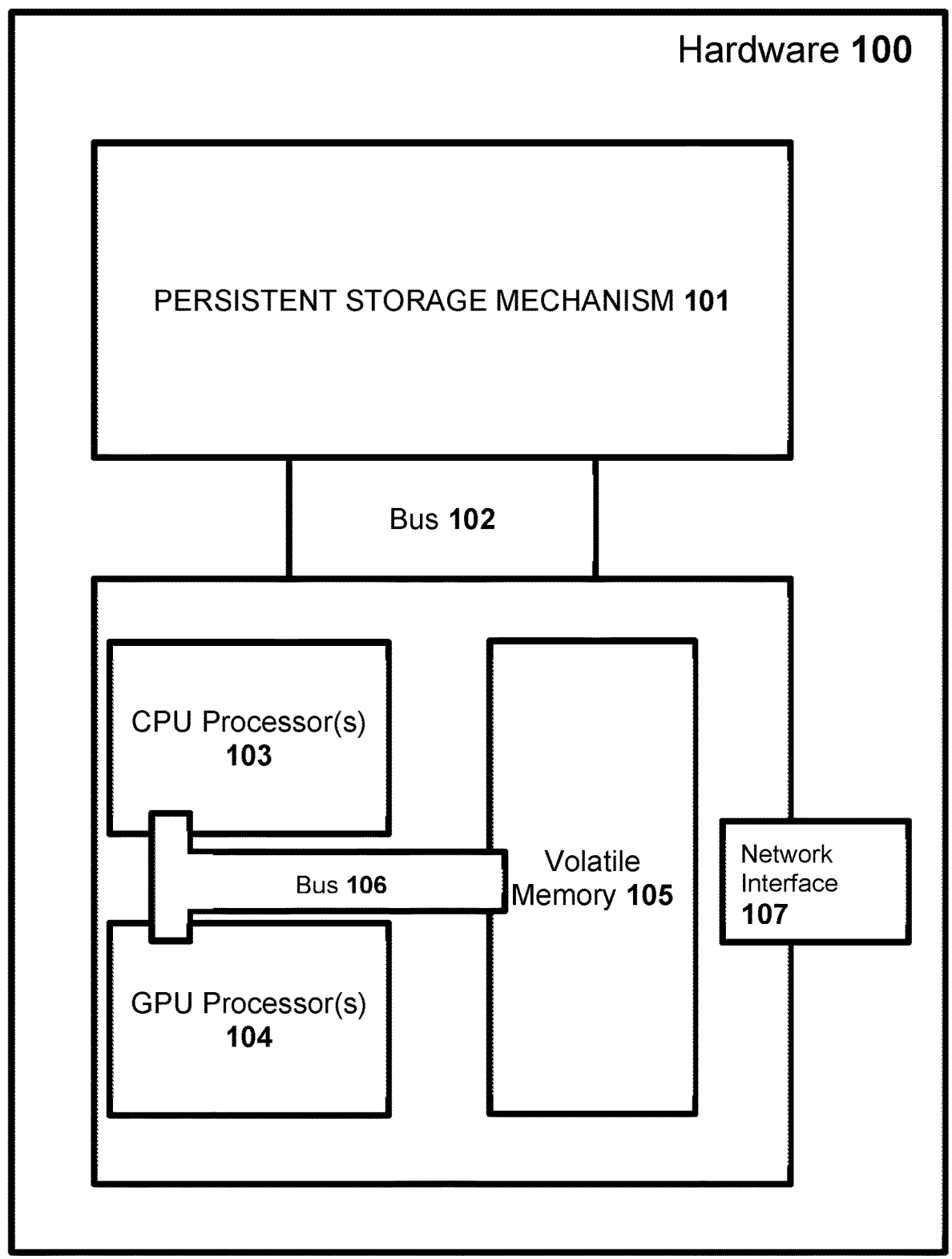
FIG. 1 is a block diagram which illustrates logical components that can be used in a hardware platform according to an embodiment of the present invention.

The following information explains the embodiments of the disclosure in detail. The disclosure may be implemented using different hardware and/or software and/or data configurations. The system in this disclosure, including the particular flow and interaction of components is described in subsequent sections with diagrams provided in the figures and referenced where appropriate.

At a high level, a system according to an embodiment of the present invention preferably uses software weaknesses, exploits and/or malware, and compromise data along with one or more statistical sampling programs, and one or more statistical clustering, classification, regression, reinforcement learning, and novelty detection programs combined with survival analysis to estimate the probability that a software weakness will be incorporated into an exploit and/or malware, and the probability that the given exploit and/or malware will be used in a compromise of an organization.

Modeling data are preferably an aggregation of software weaknesses, exploit and/or malware, and compromise data. These modeling data can be sourced from various open, commercial, and/or private sources. The aggregated modeling data is preferably transformed prior to use by any programs used for prediction. Such a transformation preferably includes reading the modeling data from the database, transforming the modeling data into the covariate vectors, and using the covariate vectors as input to subsequent operations.

A software weakness can be any program code that preferably causes one or more of: local or remote code execution; denial of service; and/or unauthorized or unintentional reading or modification of data or instructions in the program or outside the program. These software weaknesses can be either intentional or accidental—the distinction is irrelevant to the operation of embodiments of the present invention.

An exploit and/or malware can include any program that uses one or more software weaknesses causing code execution, denial of service, unauthorized read or write of the program running the code with the weakness, or to perform an operation desired by the entity using the exploit and/or malware.

A compromise can include any instance where an exploit and/or malware was used against any organization. This can include knowledge in the public domain, for example, from press releases, news articles, blog posts, or open source threat feeds. It can also include proprietary information not disclosed to the public, including but not limited to paid data sources or data from specific organizations that is not known to the public.

Statistical sampling can include techniques for creating modeling data sets on which statistical models can be built and validated. Statistical model accuracy can be highly dependent on the modeling dataset used to build the model. Statistical sampling ensures that the models generated from the modeling data are robust to noise in the input modeling dataset. Examples of statistical sampling techniques include stratified sampling, most frequent sampling, Markov Chain Monte Carlo sampling, and Generative Adversarial Sampling techniques. It should be assumed that in addition to the sampling techniques mentioned previously, additional sampling techniques not mentioned can also be used.

Statistical clustering is a technique for taking a set of inputs of distinct observations of some phenomena under consideration and separating each observation according to some measure of the input modeling data. An example application can be to cluster software weaknesses into either harmless, code execution, denial of service, unauthorized read, or unauthorized write using a simple K nearest neighbor approach. The assumptions in this approach are that the user knows how many clusters there should be, and that neighboring points are related to one another, and thus in the same cluster. It should be assumed that in addition to the clustering techniques mentioned previously, additional clustering techniques not mentioned can also be used.

Statistical classification is similar to clustering, except instead of taking input modeling data and guessing the cluster to which the modeling data point belongs, the modeling data point comes with the output, known as the label. Examples of statistical classification algorithms can include random decision forests, support vector machines, naive Bayes classifiers, and/or neural networks. Each preferably uses different statistical techniques to determine which label the given input is associated with. It should be assumed that in addition to the classification techniques mentioned previously, additional classification techniques not mentioned can also be used.

Statistical regression is similar to classification except the program attempts to find an estimate of a real valued output instead of a label. Examples of algorithms capable of statistical regression include logistic regression, neural networks, and/or support vector machines. It should be assumed that in addition to the classification techniques mentioned previously, additional classification techniques can also be used.

Reinforcement learning is a technique that permits a model to be trained based on direct human or expert system input. Modeling data are used as input. The reinforcement learning algorithm makes a prediction that is subsequently accepted or rejected by the human or expert system. The reinforcement learning algorithm uses this feedback to adjust its internal state based on this feedback.

Software weakness exploit and/or malware, and compromise modeling data are preferably stored in a database inside one or more persistent storage mechanisms running on top of, and controlled by, the one or more general purpose operating systems. The modeling data are provided as input to one or more of the first statistical sampling programs. The output of the first one or more statistical sampling programs are used as input to the first one or more statistical clustering and/or classification, and/or regression programs. The output of the first one or more statistical clustering, and/or classification, and/or regression algorithms is preferably an estimate of the probability that a given software weakness will be used in an exploit and/or malware implementation. The output of the first program is then used as input to the second one or more statistical sampling programs along with the additional simulated compromise covariate(s). The output from the second one or more statistical sampling programs is used as input to the second one or more statistical clustering, and/or classification, and/or regression programs. The second one or more statistical clustering, classification, and/or regression programs preferably utilizes relative survival analysis and/or reinforcement learning algorithm in compromise estimations. For all software weakness, the result of the secondary output of the program is preferably stored back in the modeling data storage mechanism. These final results are preferably then used to augment every software weakness's risk score.

Figure 2:
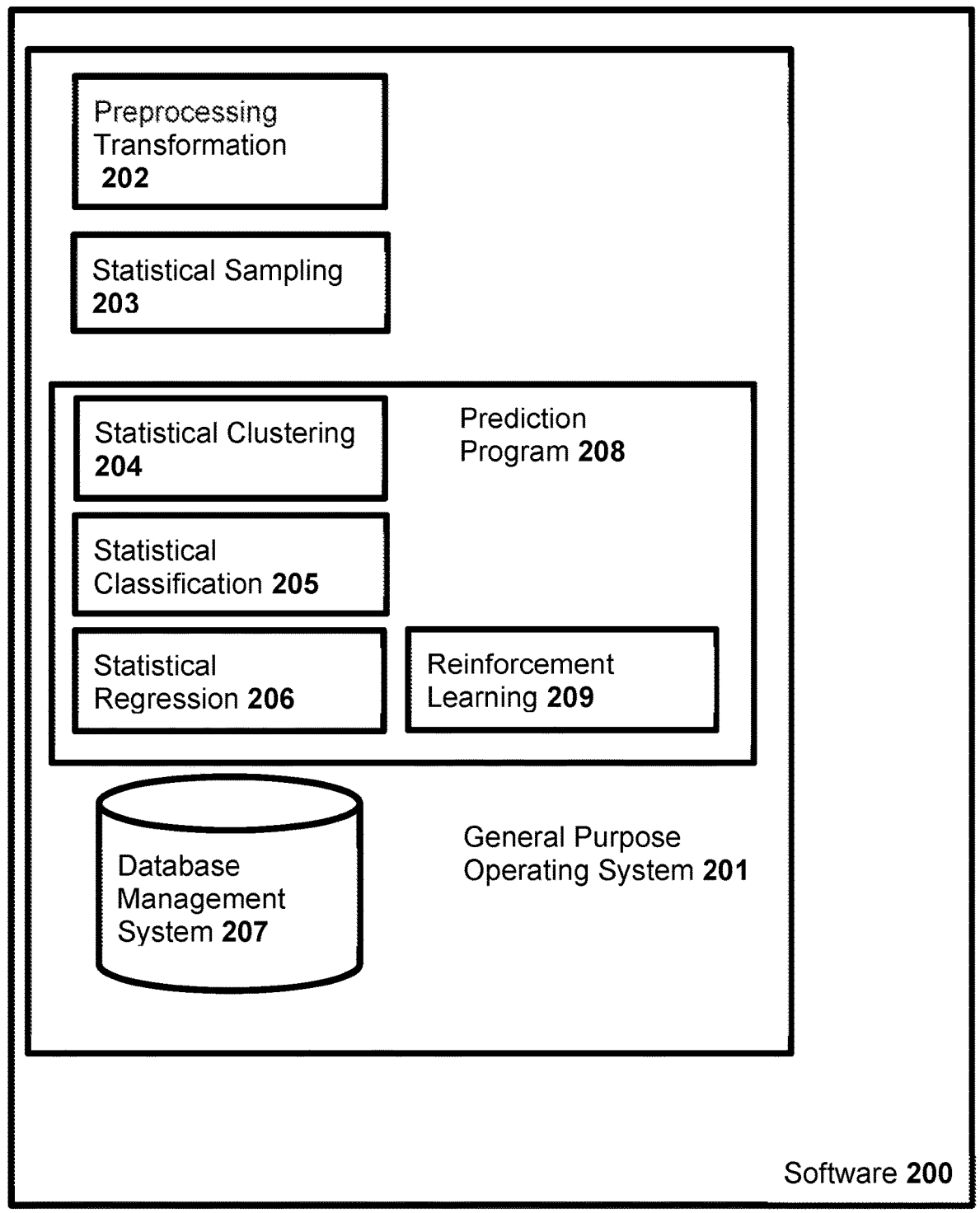
FIG. 2 is a diagram which illustrates logical components that can be used in a software platform according to an embodiment of the present invention.

Referring now to the figures, FIG. 1 illustrates hardware platform 100 upon which software 200, depicted in FIG. 2, is preferably run. Each of components 101-105 can be connected via hardware buses 102, most preferably on a printed circuit board, a network connection, or a combination thereof.

Storage mechanism 101 is most preferably a persistent storage mechanism which can include but is not limited to: solid state; optical disc; platter; tape drive; another storage technology or volatile memory technology and/or combinations thereof, including but not limited to static random-access memory (SRAM), dynamic random-access memory (DRAM) that can store program instructions. Statistical programs 203-206 and/or modeling data 300, are preferably stored across one or more storage mechanisms 101. General purpose operating system 201 is preferably responsible for controlling the access of statistical programs 203-206 to these storage mechanisms 101 and other hardware 100 and software 200 resources.

Bus 102, which can include hardware bus and/or a networked connection, is preferably used to transmit both modeling data 300 as well as software weakness data 301. When modeling data or program instructions are transferred between distinct computation units, the interconnect is most preferably a network connection such as ethernet, wifi, infiniband, combinations thereof, and the like. When the modeling data or program instructions are transferred between storage mechanisms on the same computation unit, the interconnect is preferably a bus.

When the modeling data 300 need to be transferred between distinct combinations of the hardware 100, one or more general purpose central processing units ("CPU") 103 is preferably used. CPU 103 can include a machine that performs mathematical operations on electrical signals encoding some implemented alphabet. Example operations include addition, multiplication, division, combinations thereof and the like, on modeling data stored in registers, memory, disk, or another storage media, or which otherwise alters the state of the system. Other operations, including but not limited to loading modeling data stored at an address in memory into a register or storing modeling data from a register to an address in memory or on disk are also possible. Some CPUs offer additional functionality, specifically, programmable intellectual property ("IP") units. These can be programmed using a hardware description language such as very high speed integrated circuit hardware description language ("VHDL") and are preferably used to implement specialized computational tasks including but not limited to executing programs that would otherwise be executed using the arithmetic logic unit ("ALU") and volatile memory. Such units can be implemented using field-programmable gate array ("FPGA") technologies.

Although embodiments of the present invention can perform desirable results without a graphics processing unit ("GPU") 104, in one embodiment, one or more GPUs 104 are preferably used, which are specialized computation units that are optimized for performing simple mathematical instructions in parallel across vectors of modeling data. Such architectures have a form of parallelism known as single instruction multiple modeling data parallelism. They are often used in mathematically intensive computation because of the parallelism they offer.

System hardware 100 are preferably managed by general purpose operating system 201. General purpose operating system 201 preferably gives statistical sampling, clustering, classification, and regression programs 203-206 an execution environment. The execution environment preferably permits programs 203-206 to read modeling data from a program, including for example, database management system 207. This can include the transferring of modeling data over a network—in which case the general purpose operating system 201, transparently manages the reading and writing of modeling data 300 between distinct covariates 400.

Statistical sampling program 203, preferably uses one or more general purpose operating systems, optionally networked together using a software abstraction layer—for example, a cloud computing infrastructure where multiple hardware platforms are configured. One or more machine learning software systems are preferably used that perform some combination of statistical classification 205, statistical regression 206, and/or statistical clustering 204. Zero, one, or more database management system(s) can also optionally be used.

Modeling data 300 are preferably an aggregation of software weakness data 301, exploit and/or malware data 302, and compromise data 303. As described above, modeling data 300 can optionally come from various open source, commercial, and/or private data sources.

Depending on the sources of modeling data 300, additional metadata can be associated with it. This information is preferably encoded in either categorical, real valued, and/or integer valued. This information also does not typically change once recorded, or if it does, changes very slowly over time. Examples of approximately static covariates 401 can include common weakness enumeration ("CWE"), technical impacts, or common vulnerability scoring system version 2.0 and 3.0 ("CVSSv2 and CVSS v3") attack vectors. Furthermore, these approximate statistical covariates 401 can be used to produce further derived covariates 405.

Time covariates 402 can include values that represent some component of time. Examples of features of time covariates 402 can include the difference between when a software weakness was recorded and the time it was incorporated into an exploit and/or malware; the time between the recording of a software weakness and the use of it in a compromise; or the time between when an exploit and/or malware was first developed and the time it was used in one or more compromises. Time covariates 402 can be encoded as either real, integer valued, or boolean valued. Furthermore, these time covariates 402 can be used to produce further derived covariates 405.

Frequency covariates 403 represent how often a particular property or event related to software weakness data 301, exploit and/or malware data 302, and/or compromise data 303 occurs. Frequencies are preferably encoded as integers or real numbers, depending on the particular event or property of interest. In general, integer encoded covariates can lead to integer encoded frequencies. Similarly, real value encoded covariates can produce real valued frequencies. Exceptions to either are possible. An example of a frequency encoded feature can be the count of word occurrences in a software weakness, exploit and/or malware, or compromise description from a blog post, or web article. Furthermore, these frequency covariates 403 can be used to produce further derived covariates 405.

Simulated compromise covariate 404 can include any successful deployment of one or more cyber weapons against software weakness present in a given organization's software or hardware resources. Such simulated compromise covariate 404 can be carried out by a human, or derived from human information, and performed in an automated fashion. In the end, covariate 400 is preferably validated by a human analyst, who ensures the authenticity of the successful use of exploit and/or malware data 302 in compromise data 303 against an organization. Examples of metrics of simulated compromise covariate 404 can include the number of a particular hardware or software platform running on an organization's computing resources that were successfully abused by a cyber weapon. Furthermore, these simulated compromise covariates 404 can be used to produced derived covariates 405.

Derived covariates 405 can be produced by applying some statistical operation—for example any one or more of statistical operations 203-206 as described previously, for the purposes of generating covariate 400 in itself. An example can include using a statistical clustering program 204 to generate a set of derived covariates 405 for each software weakness data 301 provided as input to the statistical clustering program 204. Furthermore, these derived covariates 405 can be used to produce yet more derived covariates 405.

Organizational covariates 406 are preferably specific to a particular organization or entity. This kind of information can be encoded as an integer, a real number, a categorical label, and/or a vector. Examples of organizational covariates 406 can include but are not limited to country, latitude, longitude, time zone, industry, number of employees, revenue, number of hardware platforms in use, number of software platforms in use, number of previous compromises, combinations thereof and the like. Furthermore, these organizational covariates 406 can be used to produce further derived covariates 405.

Miscellaneous covariates 407 can include any other properties of modeling data 300, which can include common platform enumeration ("CPE") vector labels, for vendors, software version, or other software specific information. Associate social media chatter, including but not limited to comments, shares, retweets, combinations thereof and the like of social media platforms that can include but are not limited to REDDIT® (a registered mark of Reddit, Inc.), TWITTER® (a registered mark of Twitter, Inc.), FACEBOOK® (a registered mark of Facebook, Inc.). Miscellaneous covariates can be a scalar or vector of real, imaginary, binary, or categorical information specific to software weakness data 301, exploit and/or malware data 302, and/or compromise data 303.

Figure 5:
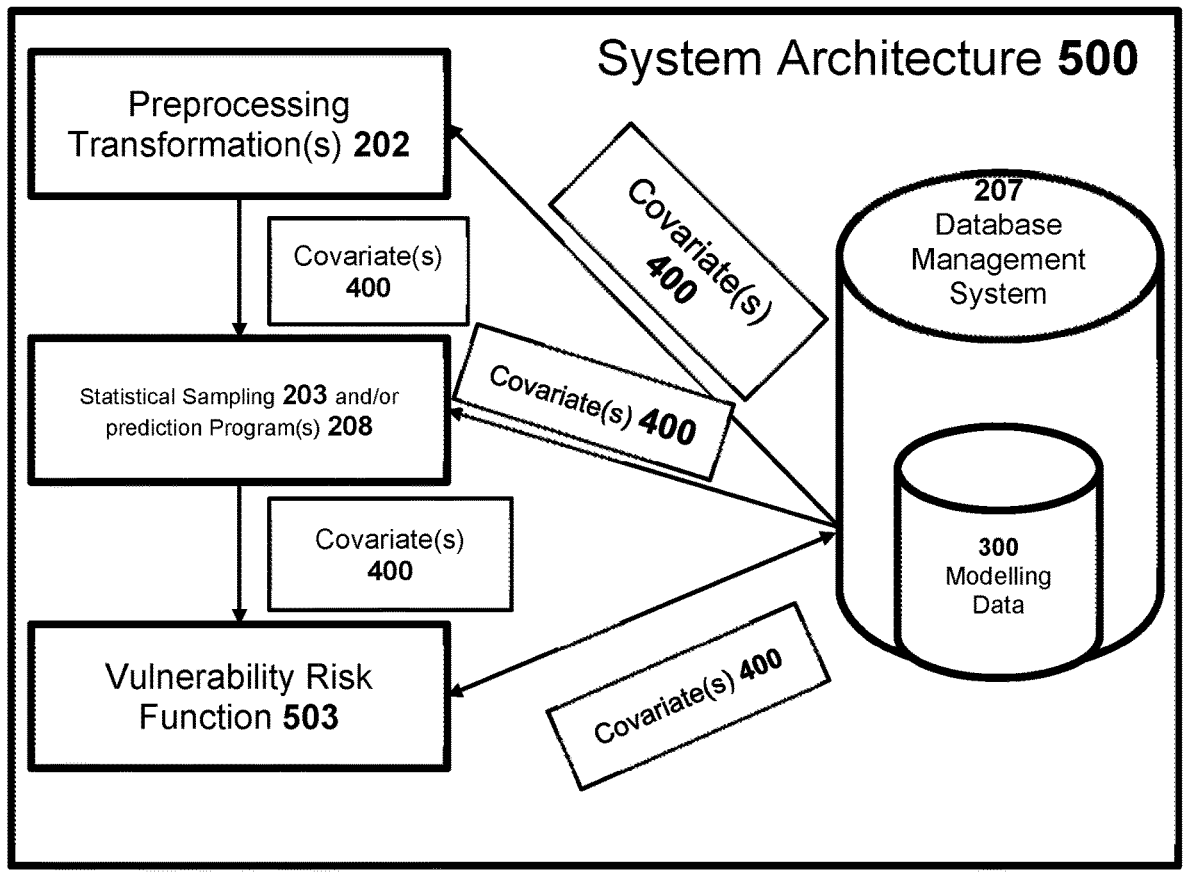
FIG. 5 is a drawing which illustrates logical organization of various hardware, software, and data components according to an embodiment of the present invention.

The system of FIG. 5 illustrates an example of system architecture 500. As illustrated therein, database management system 207 preferably contains modeling data 300. The presence of database management system 207 implies the existence of hardware 100, controlled by general purpose operating system 201. Modeling data 300 is preferably transported from database management system 207, to one or more of preprocessing transformations 202, statistical sampling programs 203, and/or prediction programs 208.

Though not illustrated, it is possible for database management system 207 to run on a completely separate set of hardware 100 and software 200. This is the case when using a cloud computing service such as GOOGLE® Compute Engine, MICROSOFT® AZURE®, or AMAZON® Web Services (GOOGLE is a registered trademark of Google, LLC, MICROSOFT and AZURE are registered trademarks of Microsoft Corporation, and AMAZON is a registered trademark of Amazon Technologies, Inc.). Modeling data 300 can optionally be transported from database management system 207 using transportation technologies, including but not limited to hardware bus 102, and/or it can optionally be transmitted over network interface 107, the underlying medium of which can be copper wire, fiber optic cable, satellite transmission, other transportation fabric, combinations thereof and the like.

Figure 4:
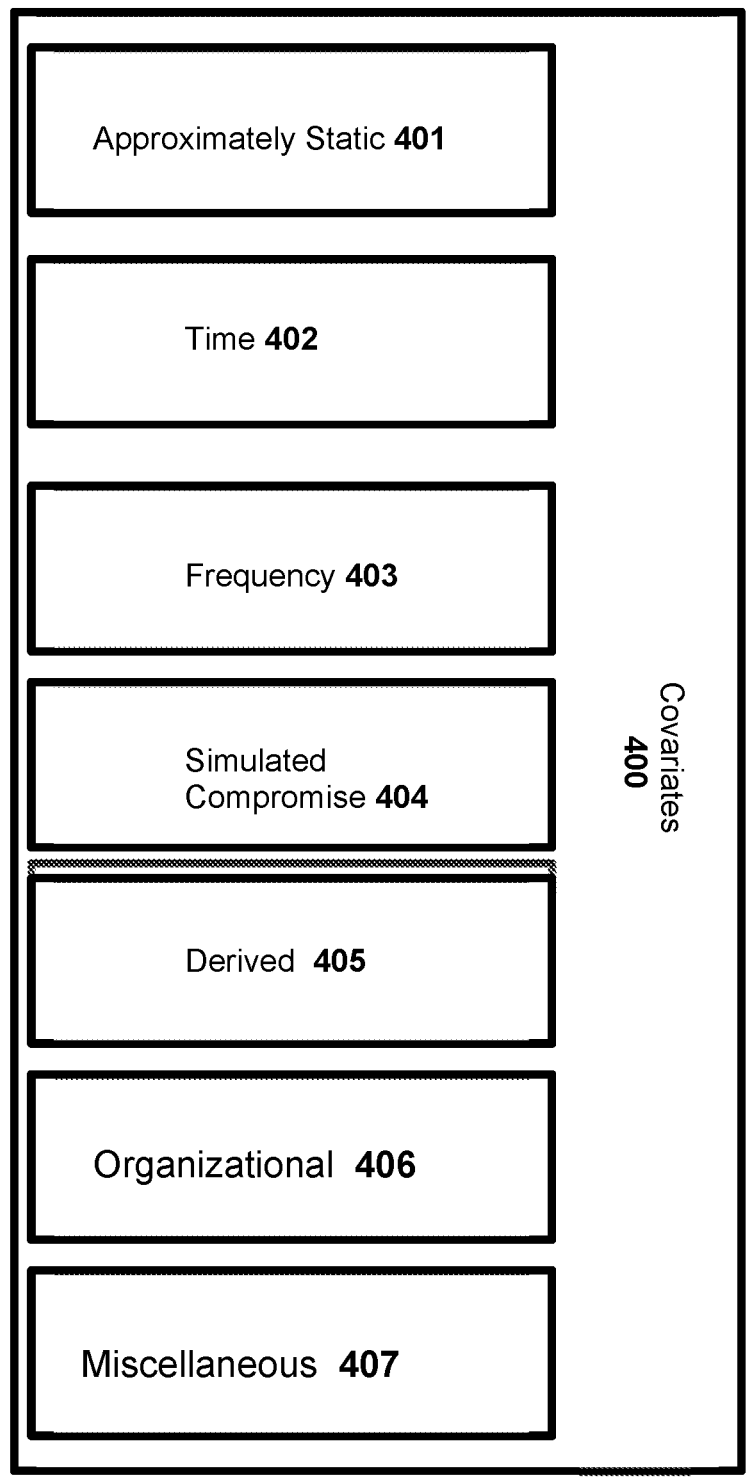
FIG. 4 is a drawing which illustrates a logical organization of covariates that can be used as input to statistical programs according to an embodiment of the present invention.

Generally, modeling data 300 are preferably sent to preprocessing transformation 202 first. This permits raw modeling data 300 to be filtered, encoded, and otherwise transformed into the expected input format, that is, covariates 400, as illustrated in FIG. 4.

Covariates 400 preferably output from preprocessing transformation 202 and are preferably provided as input to one or more statistical sampling programs 203. Statistical sampling programs 203 are preferably used to split modeling data 300 apart, reorder each entry, and/or randomly shuffle the data. Additional operations can include various upsampling and/or downsampling techniques. Upsampling and downsampling are useful in cases where specific corresponding covariate permutations and their corresponding labels are either particularly skewed to have large numbers of similar (or the same) entry in modeling data 300. An example of a situation in which upsampling can be useful is when only a small number of software weakness data 301 have been used in a simulated compromise, thus creating only a small number of simulated compromise covariates 404 entries in modeling data 300.

Upsampling can effectively increase the number of occurrences of simulated compromise covariates 404. Alternatively, however, a downsampling operation can also be used in this case, except instead of upsampling covariates 400 with a simulated compromise covariate 404, the downsampler selects only a subset of the modeling data 300 that do not have a simulated compromise covariate 404. The upsampling or downsampling operation is normally performed in a way that preserves some statistical property of modeling data 300. Another statistical sampling technique is a Markov Chain Monte Carlo simulation. This technique is useful when a large data set is required, but fewer unique covariate examples exist than is required. In such cases, covariates 400 can be selected with replacements from modeling data 300. This technique aims to create a set of covariate 400 data that approaches the actual population of all covariate statistics for one or more predictive programs 208, or statistical sampling program 203.

After modeling data 300 are transformed and sampled, the data are preferably split into at least 3 different groups, which can include training, testing, and validation data. The training data are preferably used as input into the first one or more prediction programs 208. Prediction programs 208 preferably use the training data to create a preliminary model that is able to predict whether a given software weakness has been integrated in an exploit and/or malware. The system then preferably uses the testing data to test prediction accuracy metrics of the preliminary model. Such metrics can include false positive, true negative, false negative, and true positive rates. This process of training and testing can occur a predetermined number of times or an arbitrary number of times and can thus create a plurality of models that are tested. The number of times or arbitrary number of times that models are created is most preferably dependent on the data and models. A few things to consider determining how many times a model should be considered are performance including classification accuracy, running time, and scalability.

After the best model found by the method described in the previous paragraph is selected based on the described accuracy metrics above, the final first predictive program 208 is preferably applied to the validation set to further validate prediction program 208. Assuming the first predictive program 208 generated possesses appropriate accuracy, it is then preferably applied to all modeling data 300.

The output from the application of predictive program 208 to modeling data 300 along with modeling data 300 can optionally be used along with simulated compromise covariate 404 as input into a secondary one or more preprocessing transformation programs 202. The function is preferably similar to that described by the first application of the data to the first preprocessing transformation, although the variables may change. Similarly, the output of preprocessing transformation 202 is preferably used as input to a second one or more statistical sampling programs 203. The operations of upsampling and downsampling, and other sampling techniques can be applied accordingly. Although 202-209 are referred to as being "programs" that term is not intended to limit any of 202-209 as being discrete programs and instead can include one or more functions.

The output from this second statistical sampling program 203 is preferably used as input to the second one or more predictive programs 208. The output of the final second one or more predictive programs 208 are either boolean, integer, or real value encodings of the event, the number of, e.g., days, weeks, months, or years, or the probability that a software weakness, having an exploit and/or malware, will be used in a future compromise. This final output is preferably then sent back into a storage mechanism.

The final results of statistical clustering 204, statistical classification 205, statistical regression 206, and/or reinforcement learning 209 can optionally be used with other risk and prioritization metrics to specify additional policies that should be taken when specific software weaknesses are present in an organization's computing environment. An example of a policy can be to prioritize patching software weaknesses that have been found to have a high probability of cyber weapon integration. Another example is prioritizing firewall fixes to block access to specific computing resources that contain software weakness that have a high probability of being compromised in the next 30 days.

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Note that in the specification and claims, "about" or "approximately" means within twenty percent (20%) of the amount or value given. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A method for providing a likelihood that a software weakness will be used in a future compromise, the method comprising:
    generating one or more covariates by performing a first preprocessing transformation on modeling data;
    inputting training group data into a first prediction program to create a model that predicts whether a software weakness will be integrated into one or both of an exploit and malware;
    applying a second preprocessing transformation program to the output of the first prediction program, the modeling data, and a simulated compromise covariate;
    performing a second statistical sampling function to an output of the second preprocessing transformation program; and
    applying a second predictive program to an output of the second statistical sampling function to, wherein an output of the second predictive program provides indicia of a probability that a software weakness will be used in a future compromise.

2. The method of claim 1, wherein:
    the modeling data comprises an aggregation of two or more items of data selected from software weakness data, exploit data, malware data, and compromise data;
    the software weakness comprises code that causes local code execution, remote code execution, denial of service, unauthorized reading of data; unintentional reading of data; or unauthorized modification of data; and
    the exploit or the malware comprises code that uses the software weakness and that causes one or more or a combination of denial of service, unauthorized read of a program running code with the software weakness, unauthorized write of a program running code with the software weakness, and performance of an operation desired by an entity using the exploit or the malware.

3. The method of claim 1, further comprising splitting the modeling data into at least three groups of data, wherein the at least three groups of data comprise the training group data, a testing group data, and a validation group data.

4. The method of claim 3, further comprising:
    inputting the training group data into the first prediction program to create one or more preliminary models that are able to predict whether a software weakness is integrated in the exploit or the malware;
    testing prediction accuracy metrics of the preliminary models using the testing group data, the prediction accuracy metrics including false positive, true negative, false negative, and true positive rates; and
    selecting one of the preliminary models as the model based on prediction accuracy metrics.

5. The method of claim 4, further comprising repeating the testing a predetermined number of times, wherein the predetermined number of times is based on a classification accuracy of the preliminary models, a running time of the preliminary models, or a scalability of the preliminary models.

6. The method of claim 1, further comprising performing a first statistical sampling function on the one or more covariates.

7. The method of claim 6, wherein the first statistical sampling function includes one or more or a combination of:
    splitting the modeling data apart,
    reordering entries of the modeling data, and
    randomly shuffle the modeling data.

8. The method of claim 6, wherein the first statistical sampling function performs one or both of an upsampling technique and a downsampling technique.

9. A non-transitory computer-readable medium comprising computer software for providing a likelihood that a software weakness will be used in a future compromise comprising:

code for generating one or more covariates by performing a first preprocessing transformation on modeling data;
code for inputting training group data into a first prediction program to create a model that predicts whether a software weakness will be integrated into one or both of an exploit and malware;
code for applying a second preprocessing transformation program to the output of the first prediction program, the modeling data, and a simulated compromise covariate;
code for performing a second statistical sampling function to an output of the second preprocessing transformation program; and
code for applying a second predictive program to an output of the second statistical sampling function, wherein an output of the second predictive program provides indicia of a probability that a software weakness will be used in a future compromise.

10. The method of claim 1, wherein the simulated compromise covariate includes a number of a particular hardware or a software platform running on an organization's computing resource that were successfully abused by a cyber weapon.

11. The method of claim 1, wherein:
the output of the second predictive program is used with risk and prioritization metrics to specify a policy having an action to be taken when a specific software weakness is present in a computing environment of an organization; and
the action includes a prioritize patching of the software weakness or prioritizing a firewall fix to block access to specific computing resources.

12. The non-transitory computer-readable medium of claim 9, further comprising code for splitting the modeling data into at least three groups of data, wherein the at least three groups of data comprise the training group data, a testing group data, and a validation group data.

13. The non-transitory computer-readable medium of claim 12, further comprising:
code for inputting the training group data into the first prediction program to create one or more preliminary models that are able to predict whether a software weakness is integrated in the exploit or the malware;
code for testing prediction accuracy metrics of the preliminary models using the testing group data, the prediction accuracy metrics including false positive, true negative, false negative, and true positive rates; and
code for selecting one of the preliminary models as the model based on prediction accuracy metrics.

14. The non-transitory computer-readable medium of claim 13, further comprising code for repeating the testing a predetermined number of times, wherein the predetermined number of times is based on a classification accuracy of the preliminary models, a running time of the preliminary models, or a scalability of the preliminary models.

15. The non-transitory computer-readable medium of claim 9, further comprising code for performing a first statistical sampling function on the one or more covariates.

16. The non-transitory computer-readable medium of claim 15, wherein the code for the first statistical sampling function comprises code that is configured to perform one or more or a combination of:
splitting the modeling data apart,
reordering entries of the modeling data, and
randomly shuffle the modeling data.

17. The non-transitory computer-readable medium of claim 15, wherein the code for the first statistical sampling function comprises code for performing one or both of an upsampling technique and a downsampling technique.

18. The non-transitory computer-readable medium of claim 9, wherein the simulated compromise covariate includes a number of a particular hardware or a software platform running on an organization's computing resource that were successfully abused by a cyber weapon.

19. The non-transitory computer-readable medium of claim 9, wherein:
the output of the second predictive program is used with risk and prioritization metrics to specify a policy having an action to be taken when a specific software weakness is present in a computing environment of an organization; and
the action includes a prioritize patching of the software weakness or prioritizing a firewall fix to block access to specific computing resources.

\* \* \* \* \*